No. 820,720. PATENTED MAY 15, 1906.
H. KING.
CAPSULE FILLER.
APPLICATION FILED OCT. 6, 1904.
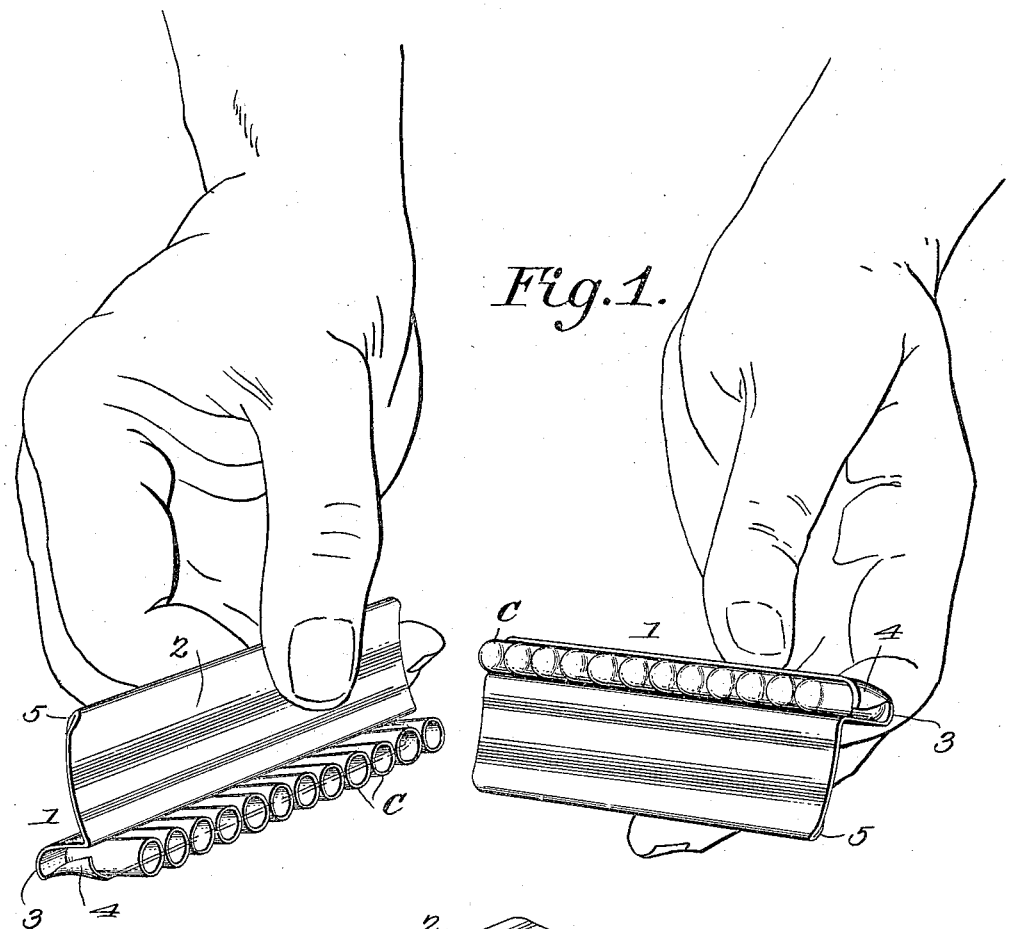
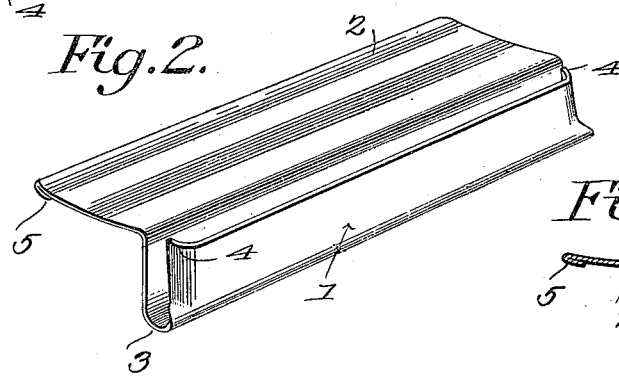
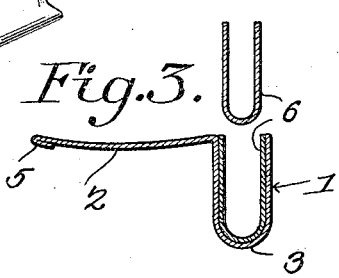
Witnesses:
Hubert King, Inventor,
by
Attorneys

UNITED STATES PATENT OFFICE.

HUBERT KING, OF NEW YORK, N. Y.

CAPSULE-FILLER.

No. 820,720.  Specification of Letters Patent.  Patented May 15, 1906.

Application filed October 6, 1904. Serial No. 227,445.

*To all whom it may concern:*

Be it known that I, HUBERT KING, a citizen of the United States, residing at New York city, in the county of New York and State of New York, have invented a new and useful Capsule-Filler, of which the following is a specification.

This invention relates to capsule-fillers.

The object of the invention is in a simple, ready, inexpensive, practical, and rapid manner and at one operation to fill a large number of capsules with any kind of medicament in powdered form; to prevent breakage of the capsules, and thus waste of the medicament; to obviate separate handling of each capsule in sealing it or applying its cap; to effect simultaneous filling of a predetermined number of capsules at one operation, thus to avoid the necessity of counting to ascertain whether the number filled is correct or not; to adapt one device for use in filling a variety of sizes of capsules, and, generally, to save time and simplify the present modes of filling capsules.

The invention consists in the various novel details of construction of a capsule-filling implement, as will be hereinafter fully described and claimed.

In the accompanying drawings, forming a part of this specification, and in which like characters of reference indicate corresponding parts, Figure 1 is a perspective view exhibiting the manner in which the device is employed, displaying the representation of two human hands, one of which, in this instance the right hand, grasps an implement charged with empty capsules, and the left hand grasps a filling implement charged with filled capsules and having its position reversed to bring the scoop or filling portion in position to supply the medicament to the other implement. Fig. 2 is a perspective detail view of the implement. Fig. 3 is a view in transverse section of a modified form of the invention.

The implement shown in Fig. 2 is constructed of metal, preferably of tin, and embodies a holder 1 and a handle 2, constituting a filler or scraper that is preferably integral with the holder and is slightly dished transversely of its length. The holder 1 is in this instance shown as provided with a rounded bottom 3 to conform to the shape of the ends of the capsules C, and generally this will be the preferred arrangement; but it is to be understood that the bottom may be made flat without departing from the spirit of the invention. The holders are provided at their ends with guards 4, which are furnished for the purpose of preventing lateral escape of the capsules, and in this instance the guards are shown as being formed by turning inward the ends of the holder; but, as will be obvious, they may be made as separate elements and secured to the holder, and, as this will be obvious, detailed illustration thereof is deemed unnecessary. The edge of the filler 2 is shown as turned upon itself, as at 5, to reinforce this part of the device and also to present a rounded scraping edge, and this is the manner in which the edge of the filler will generally be finished; but, if preferred, the inturned portion may be omitted and still be within the scope of the invention.

Generally, the holder will be of a length to contain a predetermined number of capsules— say one dozen, or more or less—and by this arrangement the filling of a definite number of capsules will be facilitated, as, if an order be given for twelve capsules and the holder will contain just that many, the operator will not be required to count the capsules when placing them within the holder.

In the form of the invention just described the holder is adapted for containing but one size of capsules; but to extend the range of usefulness and to adapt one holder to be used in filling a variety of sizes of capsules supplemental holders 6 may be employed, which will be nested in the main holder, as shown in Fig. 2. As herein shown, but two of these supplemental holders are displayed; but it is to be understood that any number desired may be utilized, and as this will be readily understood further illustration is thought to be unnecessary.

In the use of the device two of the implements are taken, and the holders are each charged with empty capsules, having their caps removed. A medicament being placed upon a suitable surface, the operator will grasp one of the implements by the filler or scraper and bring the capsules adjacent to the surface, and the other hand will grasp the other implement with the filler or scraper disposed toward the surface, and upon the operator's two hands being brought together the capsules in the right-hand implement will be filled. The caps are then applied to the capsules and the implements are transferred—that is to say, the one formerly held in the left hand is transferred to the right, and vice versa—and the filling of the capsules in the latter holder is then effected in the manner described, and the caps are applied thereto. Owing to the cheapness with which the implements may be made, a druggist can keep a large number on hand and have them charged with capsules, so that it will not be necessary when the capsules contained by two implements have been filled to remove them, as where a number are provided after the capsules in two have been filled these may be laid aside and two more filled, and so on. Another way in which the implement may be used and which may under some conditions be preferred is as follows: The implement will be held in the left hand and the capsules inserted one by one within the holder, the caps being removed as the capsules are inserted, until the holder is full. The implement is then transferred to the right hand, and the scraper or scoop is grasped by the fingers of this hand, and in this way the capsules become scoops. The medicament or other material will be placed in a box or other suitable holder, and the empty capsules will be pressed against the material, thus securing their filling, and to aid in their compact filling the bottom of the holder may occasionally be tapped upon the box or the like or the ends of the capsules may be rubbed or pressed against the side of the box, thus insuring an even filling of the whole number of capsules. When the capsules are filled, the implement is returned to the left hand and the caps are replaced one by one on the capsules, which are then removed, and the process of inserting, uncapping, filling, recapping, and removing may be repeated at pleasure.

It will be seen from the foregoing that although the device of this invention is exceedingly simple of construction it will be found of the highest efficiency in use and may readily be manufactured and sold at a price that will place it within the reach of all desired users.

Having thus described the invention, what is claimed is—

1. An implement of the class described embodying means for holding a plurality of capsules, and a plate extending at an angle to the holding means and constituting a handle and a scraper.

2. An implement of the class described comprising a main capsule-holder and a plurality of supplemental capsule-holders adapted to be nested within the main holder.

3. An implement of the class described comprising an approximately U-shaped holder and a handle combined therewith.

4. An implement of the class described comprising an approximately U-shaped holder provided with terminal guards or stops, and a handle combined with the holder.

In testimony that I claim the foregoing as my own I have hereto affixed my signature in the presence of two witnesses.

HUBERT KING.

Witnesses:
 JOHN O. LOGAN,
 FREDERICK W. BROWN.